(12) United States Patent
Robertson et al.

(10) Patent No.: US 10,793,713 B2
(45) Date of Patent: Oct. 6, 2020

(54) BIORENEWABLE BLENDS OF POLYLACTIDE AND ACRYLATED EPOXIDIZED SOYBEAN OIL COMPATIBILIZED BY A POLYLACTIDE STAR POLYMER

(71) Applicant: University of Houston System, Houston, TX (US)

(72) Inventors: Megan Robertson, Houston, TX (US); Sheli Mauck, Houston, TX (US); Shu Wang, Newark, DE (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 114 days.

(21) Appl. No.: 15/776,196

(22) PCT Filed: Nov. 17, 2016

(86) PCT No.: PCT/US2016/062503
§ 371 (c)(1),
(2) Date: May 15, 2018

(87) PCT Pub. No.: WO2017/087655
PCT Pub. Date: May 26, 2017

(65) Prior Publication Data
US 2019/0010326 A1 Jan. 10, 2019

Related U.S. Application Data

(60) Provisional application No. 62/256,615, filed on Nov. 17, 2015.

(51) Int. Cl.
| | | |
|---|---|---|
| *C08L 67/04* | (2006.01) | |
| *C08L 91/00* | (2006.01) | |
| *C08K 5/101* | (2006.01) | |

(52) U.S. Cl.
CPC ............. *C08L 67/04* (2013.01); *C08L 91/00* (2013.01); *C08K 5/101* (2013.01); *C08L 2201/06* (2013.01); *C08L 2205/025* (2013.01); *C08L 2205/03* (2013.01); *C08L 2205/08* (2013.01)

(58) Field of Classification Search
CPC ...... C08L 67/04; C08L 91/00; C08L 2201/06; C08L 2205/03; C08L 2205/08; C08L 2205/025

See application file for complete search history.

(56) References Cited

U.S. PATENT DOCUMENTS

| | | | |
|---|---|---|---|
| 2004/0192859 A1 | 9/2004 | Parker et al. | |
| 2009/0299013 A1* | 12/2009 | Fink | C08F 12/08 525/333.5 |
| 2011/0178244 A1* | 7/2011 | Connell | C08L 67/04 525/91 |
| 2013/0005901 A1 | 1/2013 | Qian et al. | |
| 2013/0184383 A1 | 7/2013 | Cochran et al. | |

OTHER PUBLICATIONS

International Preliminary Report on Patentability dated May 22, 2018, from the International Bureau of WIPO containing the Written Opinion of the International Searching Authority—the Korean Intellectual Property Office, dated Feb. 20, 2017, for International Application No. PCT/US2016/062503, 8 pages.

* cited by examiner

*Primary Examiner* — Robert D Harlan
(74) *Attorney, Agent, or Firm* — Jackson Walker LLP

(57) ABSTRACT

Biorenewable additives or modifiers can be used for improving the performance of biorenewable thermoplastics. Modified natural oils, unmodified natural oils, and compatibilizers, as well as mixtures thereof, can be used in combination with a biorenewable thermoplastic such as polylactide (PLA) in order to produce an improved thermoplastic. Modified natural oils include acrylated epoxidized soybean oil (AESO), unmodified natural oils include unmodified soybean oil (SYBO), and the compatibilizers may be star polymer compatibilizers. The improved thermoplastic may have improved tensile properties with little plasticization.

6 Claims, 12 Drawing Sheets

Scheme 1

(a)

(b)

(c)

(a)

(b)

(c)

(d)

(a)

(b)

(c)

(d)

(a)

(b)

(a)

(b)

(a)

(b)

(a)

(b)

(a)

(b)

BIORENEWABLE BLENDS OF POLYLACTIDE AND ACRYLATED EPOXIDIZED SOYBEAN OIL COMPATIBILIZED BY A POLYLACTIDE STAR POLYMER

This application claims priority to U.S. Provisional Patent Application No. 62/256,615, entitled "Biorenewable Blends of Polylactide and Acrylated Epoxidized Soybean Oil Compatibilized by a Polylactide Star Polymer," filed on Nov. 17, 2015, the entire content of which is hereby incorporated by reference.

The present invention used in part funds from the National Science Foundation (NSF) Grant No. DMR-1351788 and Grant No. CMMI-1334838 and from the Norman Hackerman Advanced Research Program of the Texas Higher Education Coordinating Board (003652-0022-2013). The United States Government has certain rights in the invention.

BACKGROUND

This disclosure pertains to renewable resource polymers and particularly to biorenewable additives for improving the properties of biodegradable thermoplastics.

The majority of commercial polymers produced today are made from byproducts of fossil fuel refining. As there is a finite supply of fossil fuels, and their manufacturing leads to harmful environmental pollution, sustainable alternatives to fossil fuel-based polymers are currently in development. Polylactide (PLA) is a biodegradable thermoplastic that is produced commercially from plant sugars, finding applications in disposable bottles and packaging, textiles, and films, among others. However, PLA has limited toughness, as evidenced by low tensile elongation at break, impact strength, and fracture toughness, limiting more widespread applications of the material.

Extensive research has been conducted to improve the toughness of PLA by blending PLA with a diverse array of polymers. Many non-biodegradable, petroleum-sourced polymers have been investigated as blending partners for PLA, such as poly(ethylene oxide), polyurethanes, and polyethylene, which showed great enhancements in PLA mechanical properties. In addition, blends of PLA and biodegradable, petroleum-derived polymers, such as poly-caprolactone and poly(para-dioxanone), have also been studied. A recent area of emphasis in the literature has been to identify fully or partially renewable components (which are in some cases also biodegradable), such as microbial polyesters, poly(propylene carbonate), and poly(tetramethylene adipate-co-terephthalate), which can modify the mechanical properties of PLA.

Vegetable oils, which are widely available, non-toxic and biodegradable, have recently gained attention as modifiers for PLA. Numerous studies have focused on the use of epoxidized, oxidized, or hydroxylated oils which plasticize the PLA matrix, lowering the glass transition temperature ($T_g$) and, in many cases, also resulting in a decrease in the tensile strength and modulus. Unmodified soybean oil (SYBO) has also been investigated as a toughening agent for PLA. SYBO and PLA are highly immiscible and therefore the blend shows no plasticization of the PLA matrix; however, it was observed that the PLA/SYBO blend exhibited phase inversion during the blend preparation using melt mixing methods, due to the significant differences in the viscosities of the PLA and SYBO at the melt mixing temperature. It was determined that 6% was the upper limit to the quantity of soybean oil that could be incorporated into the PLA matrix without phase inversion. In addition, the high degree of immiscibility of PLA and SYBO, and resulting high blend interfacial tension, leads to a broad size distribution of SYBO droplets in the PLA matrix. Additionally, the use of conjugated SYBO has been explored, which also does not plasticize PLA and can be employed in reactive compatibilization schemes.

Castor oil has proven to be an excellent toughening agent when blended with PLA, resulting in significant increases in the elongation at break and tensile toughness compared to neat PLA. In addition, castor oil does not plasticize the PLA matrix and has been inferred to produce in situ blend compatibilizers when melt mixed with PLA, due to the presence of hydroxyl groups which may undergo transesterification with PLA. However, castor oil is not as widely available as SYBO in the United States, and processing the castor beans to produce the oil results in a waste product containing ricin, a highly toxic protein.

SUMMARY

The present disclosure relates generally to biodegradable, renewable additives and modifiers for improving the performance of thermoplastics such as polylactide (PLA). Biorenewable additives are used to improve the toughness of a thermoplastic. A thermoplastic additive blend is prepared which contains the biorenewable additive and the thermoplastic. This thermoplastic additive blend is preferably comprised of up to 99% of an additive made up of a modified natural oil, a blend of a modified natural oil and an unmodified natural oil, and a blend of a modified natural oil, an unmodified natural oil, and a compatibilizer.

Prior to making the thermoplastic additive blend, the thermoplastic is first dried and stored to prevent water contamination. The additive is preferably prepared by solvent casting using up to 99% of biorenewable additives which may include an unmodified natural oil, a modified natural oil, and compatibilizer. The blend components are dissolved in solvent. The solvent is allowed to evaporate, and the resulting blend is further heated and dried under vacuum. Specimens for tensile testing, microscopy, thermal analysis, and viscosity measurements are prepared through compression molding.

A compatibilizer increases interfacial adhesion between the immiscible plastic and oil domains and reduces the blend interfacial tension. The compatibilizer may be a polymer comprised of a two components. One component of the compatibilizer is immiscible with the thermoplastic (yet miscible with the oil component) and the other component of the compatibilizer is miscible with the thermoplastic (yet immiscible with the oil component).

The following are examples of natural oils that could be used as the biorenewable additive, or a component thereof: soybean oil (SYBO), rapeseed oil, palm oil, butterfat, lard, tallow, palm oil, palm kernel oil, coconut oil, safflower oil, high oleic safflower oil, high oleic sunflower oil, poppy oil, olive oil, linseed oil, cottonseed oil, corn oil, flaxseed oil, castor oil, peanut oil, *Cuphea painteri* oil, *C. paucipetala* oil, *C. parsonsia* oil, *C. palustris* oil, *Euphorbia lathyris* oil, *E. lagascae* oil, *Coriandrum sativum* oil, *Calendula officinalis* oil, *Limnanthes alba* oil, *Crambe* oil, *Vernonia* oil, *Lesquerella* oil, cashew oil, fish oil, tung oil, sesame oil, walnut oil, canola oil, jojoba oil, microbial oils, and any genetically-modified oil derived from the preceding list of natural oils.

The following are examples of modified oils that could be used as the biorenewable additive, or a component thereof: acrylated epoxidized soybean oil (AESO), acrylated epoxidized rapeseed oil, acrylated epoxidized palm oil, acrylated epoxidized butterfat, acrylated epoxidized lard, acrylated epoxidized tallow, acrylated epoxidized palm oil, acrylated epoxidized palm kernel oil, acrylated epoxidized coconut oil, acrylated epoxidized safflower oil, high oleic acrylated epoxidized safflower oil, acrylated epoxidized high oleic sunflower oil, acrylated epoxidized poppy oil, acrylated epoxidized olive oil, acrylated epoxidized linseed oil, acrylated epoxidized cottonseed oil, acrylated epoxidized corn oil, acrylated epoxidized flaxseed oil, acrylated epoxidized castor oil, acrylated epoxidized peanut oil, acrylated epoxidized *Cuphea painteri* oil, acrylated epoxidized *C. paucipetala* oil, acrylated epoxidized *C. parsonsia* oil, acrylated epoxidized *C. palustris* oil, acrylated epoxidized *Euphorbia lathyris* oil, acrylated epoxidized *E. lagascae* oil, acrylated epoxidized *Coriandrum sativum* oil, acrylated epoxidized *Calendula officinalis* oil, acrylated epoxidized *Limnanthes alba* oil, acrylated epoxidized *Crambe* oil, acrylated epoxidized *Vernonia* oil, acrylated epoxidized *Lesquerella* oil, acrylated epoxidized cashew oil, acrylated epoxidized fish oil, acrylated epoxidized tung oil, acrylated epoxidized sesame oil, acrylated epoxidized walnut oil, acrylated epoxidized canola oil, and acrylated epoxidized jojoba oil, acrylated epoxidized microbial oils, and any acrylated epoxidized genetically-modified oil derived from the preceding list of natural oils.

The following are examples of compatibilizers which can be used as modifiers in the blends: diblock copolymer (block 1 is the same as the thermoplastic component, block 2 is a polymer miscible with the oil component), graft copolymer (backbone is the thermoplastic component and the arms are composed of one of the polymers miscible with the oil component), graft copolymer (arms are the thermoplastic component and the backbone is composed of one of the polymers miscible with the oil component), gradient copolymer (of the thermoplastic component and one of the polymers miscible with the oil component), statistical copolymer (of the thermoplastic component and one of the polymers miscible with the oil component), alternating copolymer (of the thermoplastic component and one of the polymers miscible with the oil component), multiblock copolymer (contains many blocks, ranging from 2 to 10, which alternate between the thermoplastic component and the polymer that is miscible with the oil component).

Examples of polymers that can be used as a component of the compatibilizer, which are miscible with the oil component yet immiscible with the thermoplastic: polyisoprene, polybutadiene, saturated polyisoprene, saturated polybutadiene, a polymer synthesized from the fatty acids found in vegetable oils as the monomer.

The following are examples of thermoplastics that could be modified as described in this example: polyesters such as, but not limited to, polyethylene terephthalate, polylactide, and polyhydroxyalkanoates, polyamides (such as, but not limited to, Nylons), styrenics (polystyrene and polystyrene derivatives), thermoplastic polyurethanes, polyacrylates, and polymethacrylates.

This disclosure relates to the use of a compatibilized blend of natural and modified oils as a biodegradable, renewable alternative to petroleum-based engineering plastics. This is particularly true for applications requiring enhanced toughness over the performance of neat thermoplastics such as PLA.

DETAILED DESCRIPTION OF PREFERRED EMBODIMENTS

Figure 1:
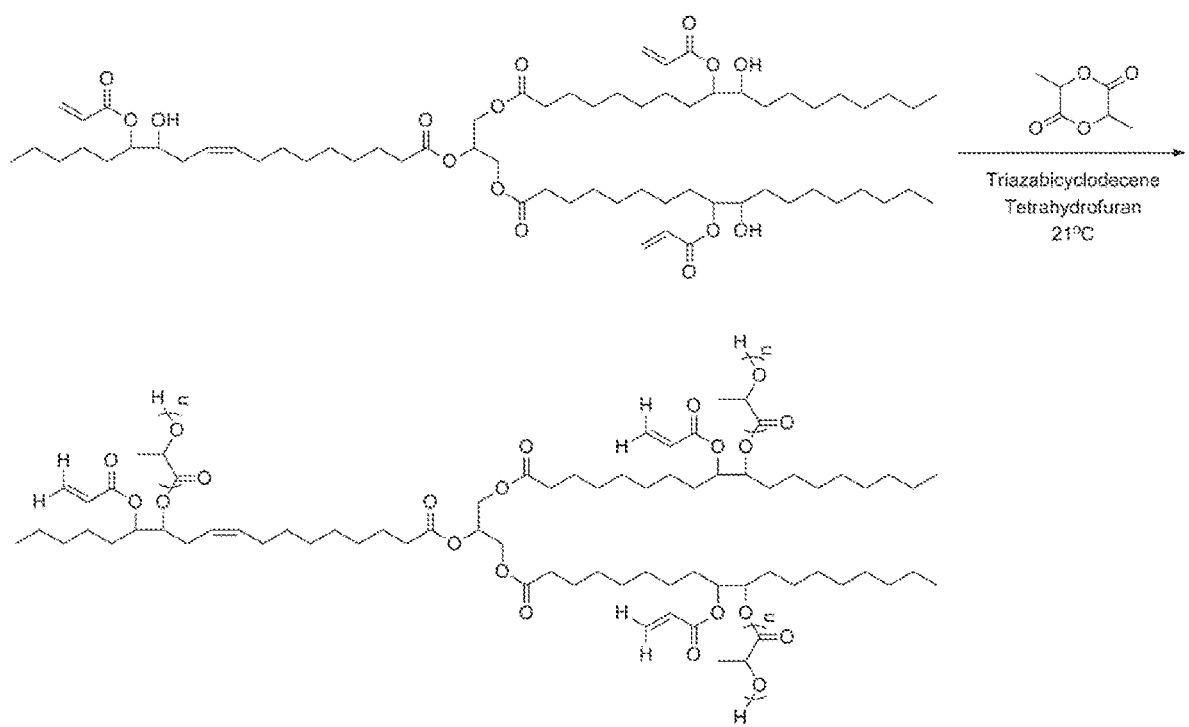
FIG. 1 shows a scheme (Scheme 1) for the synthesis of a star polymer containing an AESO core and PLA arms.

The present disclosure relates to blends of biorenewable additives or modifiers for use in improving the performance of biorenewable thermoplastics. The biorenewable additive mixture may include an unmodified natural oil, a modified natural oil, a compatibilizer, or combinations thereof. Preferred compatibilizers include polymers comprised of two components, one that is immiscible with the thermoplastic (yet miscible with the oil component) and one that is miscible with the thermoplastic (yet immiscible with the oil component).

In preferred embodiments, the biorenewable additive mixture makes up to 99 wt % of the biorenewable thermoplastic additive blend. In additional preferred embodiments, the resulting biorenewable thermoplastic additive blend includes about 70-99 wt % of the thermoplastic, about 1-30 wt % of a modified natural oil, about 0-29 wt % of an unmodified natural oil, and about 0-10 wt % of a compatibilizer.

Acrylated epoxidized soybean oil (AESO) is a multifunctional, commercially available modified soybean oil produced through the epoxidation of SYBO followed by the ring-opening of the epoxide groups with acrylic acid. Through this process, the carbon-carbon double bonds on the SYBO structure are functionalized with both acrylate and hydroxyl groups. AESO is a reactive oil, as the acrylate groups polymerize at elevated temperatures in the presence of air (without the addition of a radical initiator), in stark contrast to unmodified SYBO, which is a relatively non-reactive oil. Prior studies have utilized AESO and other functionalized vegetable oils as monomers for the preparation of highly crosslinked thermosets. However, there are no reports in the literature of the use of AESO as a reactive modifier to improve the toughness of thermoplastics such as PLA.

In the present disclosure, a multifunctional vegetable oil, acrylated epoxidized soybean oil (AESO), can be utilized as a preferred embodiment of a biodegradable, renewable additive to improve the toughness of thermoplastics such as PLA. AESO is a highly reactive oil, providing a dispersed phase with tunable properties in which the acrylate groups undergo crosslinking at the elevated temperatures required for processing the blends. The morphological, thermal and mechanical behavior of PLA/oil blends were investigated, in which the dispersed oil phase consisted of AESO, SYBO, or a 50/50 mixture of AESO/SYBO. Additionally, the hydroxyl groups present on AESO were utilized for the synthesis of in situ or pre-formed compatibilizers for the PLA/oil blends. The oil additives were found to toughen the PLA matrix, with significant enhancements in the elongation at break and tensile toughness values, while maintaining the glass transition temperature of neat PLA. In particular, a blend containing a thermoplastic, such as PLA, AESO, SYBO, and a star polymer compatibilizer (STAR) exhibits a uniform oil droplet size distribution with small average droplet size and interparticle distance, resulting in the greatest enhancements of thermoplastic tensile properties with no observable plasticization.

Preferred embodiments include the use of acrylated epoxidized soybean oil (AESO), unmodified soybean oil (SYBO), and star polymer compatibilizers, as well as mixtures thereof, in combination with a biorenewable thermoplastic such as polylactide (PLA) in order to produce an improved thermoplastic. In certain embodiments, the star polymer compatibilizer includes a core of AESO with PLA arms. In certain embodiments, the improved thermoplastic is PLA having improved tensile properties.

Preferred embodiments include the use of AESO, SYBO, and a 50/50 mixture of the oils in combination with PLA. Additional preferred embodiments further incorporate a star polymer compatibilizer (STAR), which may be a PLA star polymer. Preferred embodiments of the PLA star polymer may have the structure shown in FIG. 11(a), in which n is an integer and can vary. Preferably, n is between about 10 and about 10,000. In preferred embodiments, the resulting biorenewable thermoplastic includes about 70-99 wt % PLA, about 1-30 wt % AESO, about 0-29 wt % SYBO, and about 0-10 wt % star polymer compatibilizer. With regard to PLA, at concentrations higher than 99% it is essentially a pure component having the undesirable properties discussed above. At concentrations much lower than 70%, it is expected to have inferior qualities due to the reduced amount of PLA. With regard to AESO, it is ideally present at a maximum of about 30%. One preferred embodiment encompasses a biorenewable thermoplastic having about 70 wt % PLA and about 30 wt % AESO. An additional preferred embodiment encompasses a biorenewable thermoplastic having about 99 wt % PLA and about 1 wt % AESO. With regard to SYBO, this material is optional as an additive in the modified biorenewable thermoplastic. A preferred maximum of SYBO is 29 wt %, allowing for at least about 1 wt % AESO. A preferred embodiment encompasses a biorenewable thermoplastic having about 70 wt % PLA, about 29 wt % SYBO, and about 1 wt % AESO. With regard to the star polymer compatibilizer, the preferred maximum is about 10 wt %, as greater concentrations are expected to be excessive for compatibilization purposes. The star polymer compatibilizer is an optional component, as preferred embodiments cover uncompatibilized blends.

An additional preferred embodiment includes about 95 wt % PLA, in combination with about 5 wt % AESO. Additional preferred embodiments include, rather than AESO alone, a blend of SYBO and AESO. In a preferred embodiment, a 50/50 mixture of SYBO/AESO is utilized and is present at about 5 wt %, preferably about 2.5 wt % AESO and about 2.5 wt % SYBO. An additional preferred embodiment of the biorenewable thermoplastic includes about 90 wt % PLA, in combination with about 2.5 wt % AESO, about 2.5 wt % SYBO, and about 5 wt % of the star polymer compatibilizer. In this embodiment, the additive is a 25/25/50 blend of AESO, SYBO, and star polymer compatibilizer.

The morphology of the PLA/oil blends consists of oil droplets dispersed throughout the PLA matrix. As illustrated in the examples below, the PLA/SYBO blend exhibits the largest average oil droplet diameter and greatest breadth of the droplet size distribution. The use of AESO or a 50/50 mixture of AESO/SYBO in the PLA/oil blend results in a smaller average droplet diameter and narrower droplet size distribution, likely due to the formation of compatibilizing molecules through the transesterification of PLA and AESO during the blend preparation process. Minimal plasticization is observed in the blends, with glass transition (Tg) values comparable of that to neat PLA. The % crystallinity of the blends is lower, and the melting temperature is slight higher, than that of neat PLA. The presence of the oil droplet phase results in rubber toughening of the PLA matrix, in which the elongation at break and tensile toughness of all PLA/oil blends is higher than that of neat PLA. The PLA/AESO blend also exhibits a higher tensile strength than all other PLA/oil blends, which was comparable to neat PLA. The preferred embodiment of PLA/AESO/SYBO blend shows desirable attributes of highly reproducible tensile properties and a relatively narrow oil droplet size distribution and low average droplet diameter.

Addition of the PLA star polymer to the PLA/AESO/SYBO blend results in a reduction in the average droplet diameter and increased reproducibility of the measured tensile parameters. The compatibilized blend exhibits the highest $T_g$ and percent crystallinity of all blends studied, indistinguishable from that of neat PLA. Addition of the PLA star polymer to the PLA/AESO/SYBO blend also results in the highest elongation at break and tensile toughness values of all the PLA/oil blends (a factor of 10 and 6 times improvement over neat PLA, for the elongation at break and tensile toughness, respectively). The present biorenewable thermoplastics, including a preferred embodiment made up of a quaternary blend of PLA, AESO, SYBO, and the PLA star polymers, show great viability as a biodegradable, renewable alternative to petroleum-based engineering plastics in applications requiring enhanced toughness over the performance of the neat thermoplastic.

Example 1. Compatibilizer Synthesis

A star compatibilizer was synthesized to improve interfacial adhesion between the immiscible PLA and oil domains in PLA/oil blends. The compatibilizer consisted of an AESO core with PLA arms. The star polymer was synthesized through the ring-opening of L-lactide, initiated from the hydroxyl groups present on AESO, following general ring-opening polymerization procedures. The reaction scheme is provided in Scheme 1, shown in FIG. 1. On average, there are 2.8 arms per molecule.

L-lactide was purified through recrystallization in methanol (twice) and subsequent drying under vacuum. Oxygen and moisture free tetrahydrofuran (THF) and dichloromethane (DCM) were obtained from a Pure Process Technology (Nashua, N.H.) solvent purification system. In this system, solvents used in polymer synthesis are purified. The solvent is run through a column that removes water and other impurities. Use of a vacuum pump and inert gas (argon) also removes air from the system. AESO was diluted with dry DCM and stirred with calcium hydride in vacuo, followed by filtration. DCM was removed from the AESO through distillation. The recovered AESO was stored in a glove box freezer on molecule sieves. In the glove box, stoichiometric amounts of AESO and L-lactide were added to a 100 mL flask and subsequently dried by the addition of molecular sieves in dry THF (with stirring for 12 hours). The dried AESO and L-lactide mixture in THF was filtered through 0.45 µm nylon filters into a reaction flask containing the catalyst, 1,5,7-triazabicyclo-[4.4.0]dec-5-ene (Sigma Aldrich, 98%). After 5 minutes, benzoic acid (Sigma Aldrich, ≥99.5%) was added to the flask to quench the reaction. The resulting PLA star polymer (referred to as STAR) was purified through precipitation in methanol and drying in a vacuum oven at room temperature.

Example 2. Blend Preparation

Blends were prepared containing poly(L-lactide) (referred to as PLA) obtained from NatureWorks LLC (Minnetonka, Minn.) as Ingeo™ biopolymer 4043D, with the following molecular weight distribution characteristics: number-average molecular weight ($M_n$)=57.0 kg/mol and dispersity (Đ)=2.43 (determined with gel permeation chromatography using light scattering). Prior to use in blending, PLA was dried at 60° C. overnight and stored in a desiccator to prevent water contamination. Other blend components included consumer-grade soybean oil (SYBO, Crisco all-natural vegetable oil (Orrville, Ohio)) and acrylated epoxidized soybean oil (AESO, Sigma Aldrich (St. Louis, Mo.), inhibited with 8,500 ppm monomethylether hydroquinone), both used as received. A PLA star polymer (STAR) was synthesized as described in Example 1 above. The exemplary blend compositions used in these examples are described in Table 1 below.

TABLE 1

Blend Compositions

| Blend | wt % PLA | wt % AESO | wt % SYBO | wt % STAR |
|---|---|---|---|---|
| PLA/SYBO | 95 | 0 | 5 | 0 |
| PLA/AESO | 95 | 5 | 0 | 0 |
| PLA/AESO/SYBO | 95 | 2.5 | 2.5 | 0 |
| PLA/AESO/SYBO/STAR | 90 | 2.5 | 2.5 | 5 |

The total oil content was fixed at 5%, as prior studies on PLA/SYBO and PLA/castor oil blends showed a reduction in the tensile strength and modulus, and minimal improvement in the elongation at break with higher oil contents.

All polymer blends were prepared by solvent casting using the weight percentages specified for each blend (shown in Table 1). The blend components were dissolved for 12 hours in dichloromethane (VWR International LLC (Radnor, Pa.), BDH) with stirring (20 mL dichloromethane per gram of blend components). The solutions were poured into aluminum pans gradually over 12 hours while allowing the solvent to evaporate. The resulting films were dried in a fume hood for 12 hours and then heated under vacuum at 190° C. for 10 hours. For some selected samples, a drying temperature of 160° C. was employed, where specified.

Specimens for tensile testing, microscopy, thermal analysis, and viscosity measurements were prepared through compression molding. Specimen geometries are discussed below for each characterization technique. Aluminum molds were coated with a polymer-release spray. Solvent-cast and vacuum-dried polymer blends were removed from the aluminum pans, cut into small pieces, and placed in the coated aluminum molds on a Carver Hotpress, preheated to 190° C. for 30 minutes. The specimens were then pressed at 190° C. three times at the following pressures and durations sequentially: 1 psi for 1 minute and 30 seconds, 1 psi for another 1 minute and 30 seconds, and 2 psi for 5 minutes. Between each step, there was a 10 second period during which the pressure was released. Immediately following compression molding, the specimens were removed from the press and cooled to room temperature on the benchtop. The specimens were stored in a desiccator at room temperature for at least 24 hours prior to characterization.

Example 3. Blend Characterization

Gel Permeation Chromatography (GPC). GPC was conducted on a Viscotek GPC instrument with ResiPore columns, using stabilized THF (OmniSolv, HPLC grade) as the mobile phase. The instrument operated at a temperature of 30° C. and a flow rate of 1 mL/min. The injection volume was 100 µL. Samples were prepared for GPC by dissolving in stabilized THF at a concentration of 1-2 mg/mL. The absolute number-average molecular weight, $M_n$, and dispersity, Đ, of the PLA homopolymer (NatureWorks LLC: Ingeo™ biopolymer 4043D) and PLA star polymer were determined with light scattering. A differential refractive index (dn/dc) of 0.049 mL/g was used.

Nuclear Magnetic Resonance ($^1$H NMR). $^1$H NMR experiments were performed on JEOL ECA-400 (Peabody, Mass.) instrument using deuterated chloroform (99.8 atom % D) as the solvent. Chemical shifts were referenced to an internal standard, tetramethylsilane.

Soxhlet Extraction. Oil samples (SYBO, AESO, and a 50/50 mixture of SYBO/AESO) were vacuum-dried overnight at 190° C. Cellulose thimbles were vacuum-dried at 60° C. for 8 hours then immediately weighed. A known mass of dried oil was placed in the thimble. The sample-filled thimbles were placed in a soxhlet extractor containing THF. The extraction was conducted for 24 hours at 60° C. A rotary evaporator was used to remove most of the THF from the extract. The extract was then vacuum-dried for 12 hours at 60° C. The thimble and the insoluble portion of the sample left in the thimble after extraction were also vacuum-dried at 60° C. for 12 hours. The insoluble portion was weighed to determine the percentage of the sample that was insoluble. The soluble portion of the sample was subsequently analyzed with GPC.

Microscopy and Image Analysis. The blend morphology was observed using a Leica DM2500M (Buffalo Grove, Ill.) optical microscope using a 50× magnification lens (HCX PL Fluotar 50×/0.80 BD). A portion of the PLA/oil blend was placed on a plain, precleaned 75×25 mm microslide (thickness 0.96 to 1.06 mm) and covered with a cover slip. The sample was heated until the PLA melted, producing a bubble free layer, which was then cooled to room temperature before imaging. ImageJ software was used to subtract a dark background from the images.

The fracture surfaces of PLA/oil tensile bars were imaged using a LEO 1525 field emission scanning electron microscope (LEO 1525 Electron Microscopy Inc., Thornwood, N.Y.) at a voltage of 15 kv. The fracture surface was etched and subsequently coated with gold using a Denton Vacuum Desk V (Moorestown, N.J.) sputter coater. The gold thickness was approximately 10 nm.

The micrographs were analyzed using ImageJ software to determine the area of each oil droplet, which was then converted to an equivalent diameter of a sphere ($D_i=2(A_i/\pi)^{1/2}$). No further correction of $D_i$ was made for the underestimation of $D_i$ due to the two dimensional projection of the sphere. Additionally, droplets of a size too small to be observed at the magnification chosen have been neglected. The Sauter mean diameter ($D_m$) was calculated for the population of oil droplets in the micrograph:

$$D_m = \frac{\sum_i^n D_i^3}{\sum_i^n D_i^2}$$

where $D_i$ is the diameter of one oil droplet and n is the number of oil droplets in 1 micrograph of the blend referenced. The standard deviation was calculated based on the population of oil droplets examined within the same image.

The matrix ligament thickness (average interparticle distance), T, was also calculated following literature procedures:

$$T = D_m \left[ \left(\frac{\pi}{6\phi}\right)^{1/3} \exp(1.5 \ln^2\sigma) - \exp(0.5 \ln^2\sigma) \right]$$

where σ is a measure of the polydispersity in the particle size distribution (α=1 is monodisperse):

$$\ln \sigma = \sqrt{\frac{\sum_{i=1}^{N} n_i (\ln d_i - \ln D_m)^2}{\sum_{i=1}^{N} n_i}}$$

Tensile Testing.

Tensile bars were prepared according to the ASTM D 638 standard (Type IV specimen). The bars had a gauge thickness of 1.6 mm. The tensile bars were tested by a class B-2 extensometer on an Instron tensile tester (Norwood, Mass.) containing a 100 N load cell, pneumatic grips with a maximum of 2 kN, and a grip pressure of 40 psig. A strain rate of 10 mm/min was employed.

Thermogravimetric Analysis (TGA).

The degradation temperatures of PLA and PLA-AESO tensile bars were determined by TGA using a TA Instruments Q50 (New Castle, Del.) instrument. The samples were heated at 10° C./min to 575° C. The samples were tested with a balance nitrogen purge flow of 40 mL/min and a sample nitrogen purge flow of 60 mL/min.

Differential Scanning Calorimetry (DSC).

Thermal properties of PLA/oil blends and PLA/oil tensile bars were determined using DSC on a TA Instruments Q2000 differential scanning calorimeter with 10-15 mg samples in Tzero Aluminum Hermetic pans under a nitrogen purge of 50 mL/min. All temperatures scans were conducted at a rate of 10° C./min. For the $1^{st}$ cycle, each sample was equilibrated at 24° C. Then, the temperature was ramped to 200° C. For the $2^{nd}$ cycle, the sample was then cooled to 20° C. then heated again to 200° C. Melting temperature ($T_m$), crystallization temperature ($T_c$), glass transition temperature ($T_g$), and peak integrations were determined by TA Analysis software. The % crystallinity was determined using the melting peak area, and the enthalpy of melting for an infinite PLLA crystal, 94 J/g. $T_m$ and % crystallinity were determined from the $1^{st}$ heating cycle in order to probe the properties of the tensile bar resulting from the thermal history relevant to the compression molding process. $T_g$ was determined from the $2^{nd}$ heating cycle. The error in DSC temperature measurement is estimated to be 1-2° C., based on analysis of repeated measurements taken on equivalent samples.

Viscosity Measurement.

Dynamic viscosity of the blends was measured on a TA Instruments DHR-2 rheometer. Disks (25 mm diameter) of the polymer blends were prepared through compression molding. The disks were placed between 25 mm parallel plates, and the dynamic moduli were measured using a frequency sweep from 1-100 rad/s (at a strain chosen to be in the linear viscoelastic region) while heating in the presence of nitrogen gas.

Example 4. Effect of Processing Conditions on Components

Blends containing PLA and oil were prepared through solvent casting and subsequent drying at 190° C., following the procedures described in Example 2 above. The effect of processing on the blends components, PLA and the oils, was examined. The molecular weight distribution of the commercial PLA sample used in all blends was investigated using GPC prior to and after solvent casting, drying at 190° C., and compression molding at 190° C., with results shown in FIG. 2(a). The molecular weight distribution exhibited no significant changes upon processing the PLA, and the drying protocol employed for the PLA pellets was sufficient to remove water and prevent transesterification under these conditions.

The potential for crosslinking of the vegetable oils during the blend drying process was also considered. Samples of pure AESO, pure SYBO, and a 50/50 AESO/SYBO mixture were dried under vacuum at 190° C. (following the same procedure used in preparation of the blends). No visible differences were noticed in the SYBO molecular weight distribution after vacuum-drying at 190° C. (shown in FIG. 2(b)), and the dried SYBO readily dissolved in THF.

Figure 2:
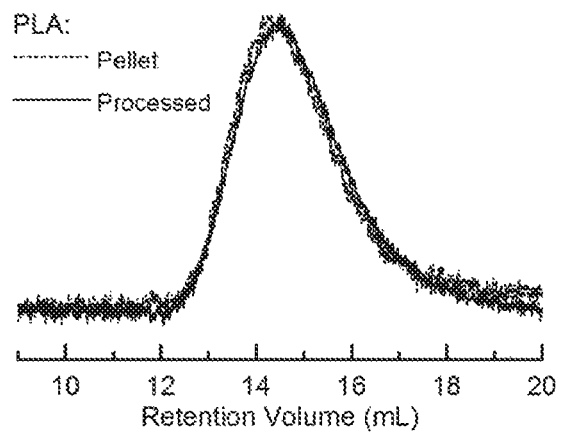
FIG. 2 shows normalized gel permeation chromatography (GPC) refractometer signals for (a) neat PLA pellets compared to processed PLA tensile bar, (b) SYBO before and after drying, and (c) AESO and SYBO before drying, and AESO and a 50/50 blend of SYBO and AESO after drying.
Figure 2:
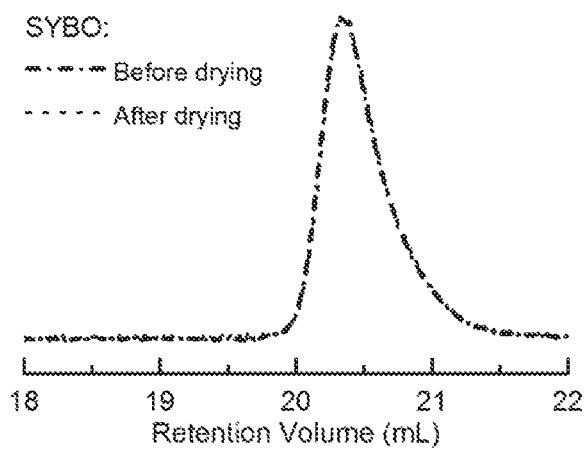
Figure 2:
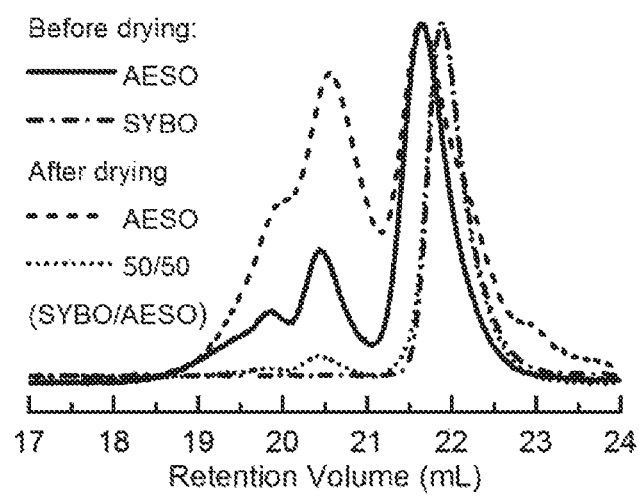

The pure AESO and 50/50 AESO/SYBO mixtures were also dried under vacuum at 190° C. Visible changes were observed in these samples after drying: the viscosity of the AESO/SYBO mixture was noticeably increased and the pure AESO sample behaved as expected for an elastomer, consistent with the hypothesis that the AESO underwent crosslinking upon drying. Soxhlet extraction (in THF) was employed to quantify these observations: 91.8 wt % of the dried pure AESO sample was insoluble whereas 48.4 wt % of the dried 50/50 AESO/SYBO sample was insoluble. GPC data obtained from the soluble fractions of these samples are shown in FIG. 2(c). Comparison of the data obtained from SYBO and AESO prior to drying with that of the dried 50/50 mixture indicates that the soluble portion of the dried 50/50 AESO/SYBO sample is almost entirely uncrosslinked SYBO, with a small amount of uncrosslinked AESO in the extract. In the case of the pure AESO sample, the GPC data obtained from the soluble portion are consistent with uncrosslinked AESO (FIG. 2(c)). This shows that the majority of the AESO (greater than 90%) was crosslinked in both the samples (pure AESO and the 50/50 AESO/SYBO mixture) after drying at 190° C., while the SYBO remained unaffected.

Example 5. Physical Behavior

Blends containing PLA and oil were prepared through solvent casting and subsequent drying at 190° C. Specimens with dimensions following the ASTM D638 standard (Type IV bar with gauge thickness of 1.6 mm) were prepared through compression molding at 190° C. The morphological, thermal, and mechanical properties of the blends were examined. The following choices of vegetable oil were explored: SYBO, AESO, and a 50/50 mixture of SYBO/AESO. Discussion of blends including the STAR polymer is contained within Example 7 below.

Figure 3:
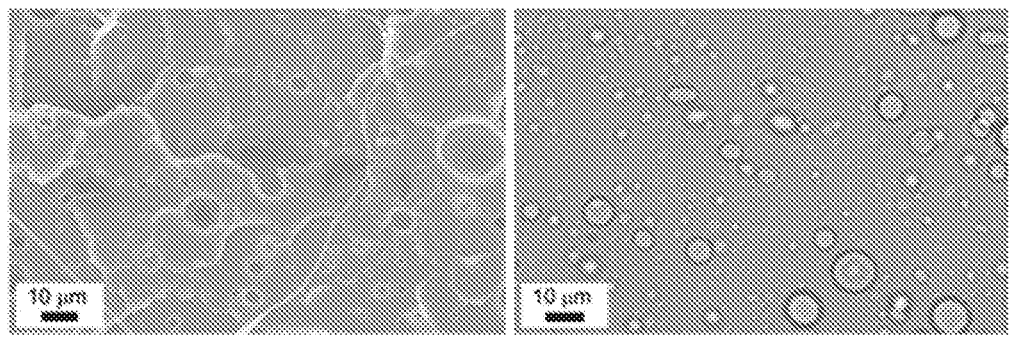
FIG. 3 shows, on the left, scanning electron micrographs of tensile bar fracture surfaces and, on the right, optical micrographs of (a) PLA/SYBO blend, (b) PLA/AESO blend, (c) PLA/AESO/SYBO blend, and (d) PLA/AESO/SYBO/STAR blend.
Figure 3:
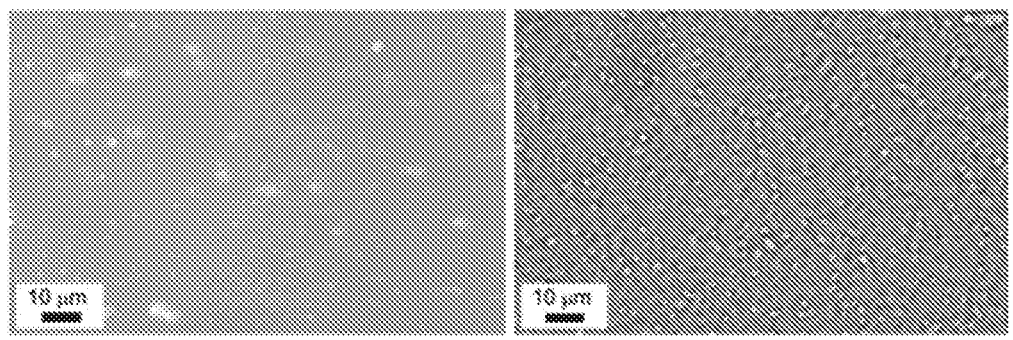
Figure 3:
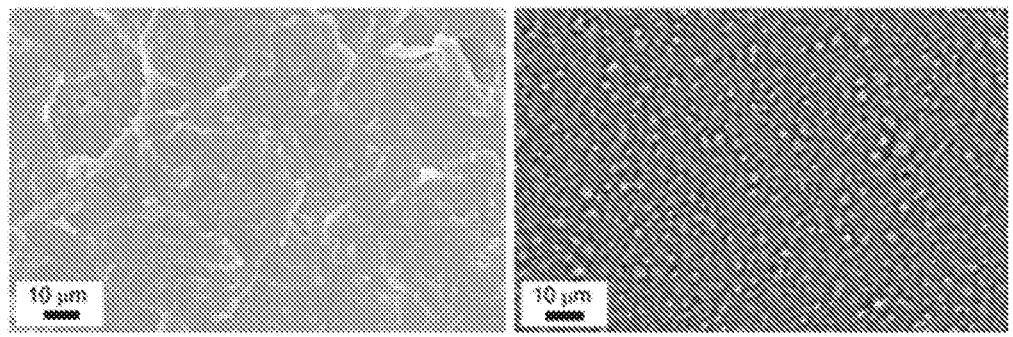
Figure 3:
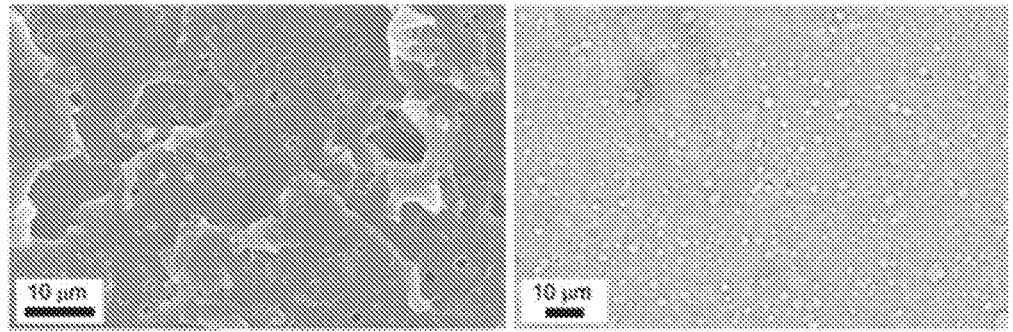
Figure 4:
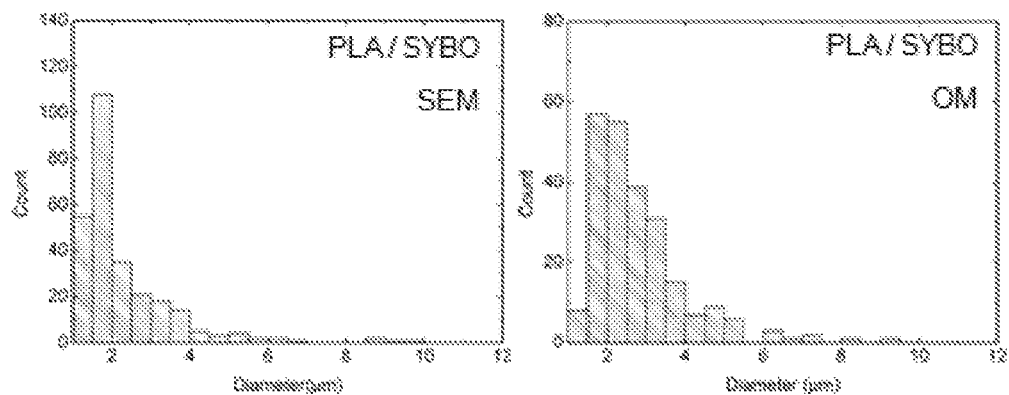
FIG. 4 shows particle size distributions characterized through (a) on the left, scanning electron microscopy (SEM), and on the right, optical microscopy (OM), of PLA/SYBO, (b) optical microscopy (OM) of PLA/AESO, (c) on the left, SEM, and on the right, optical microscopy (OM) of PLA/AESO/SYBO, and (d) SEM of PLA/AESO/SYBO/STAR.
Figure 4:
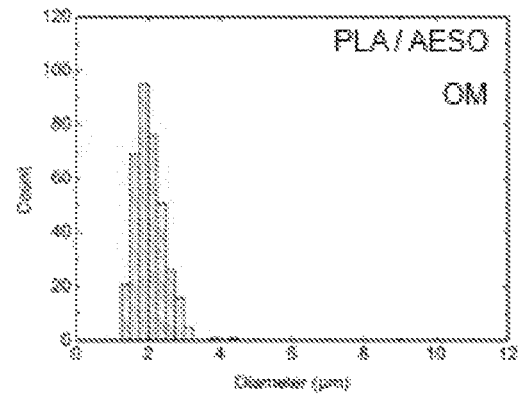
Figure 4:
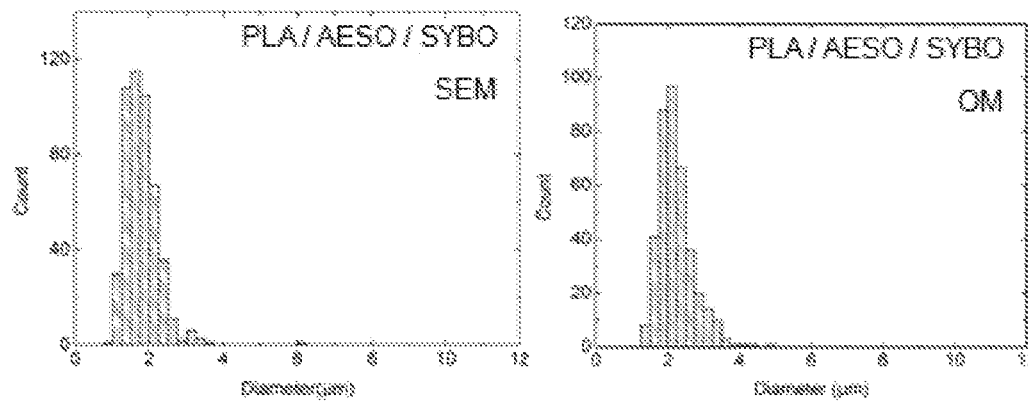
Figure 4:
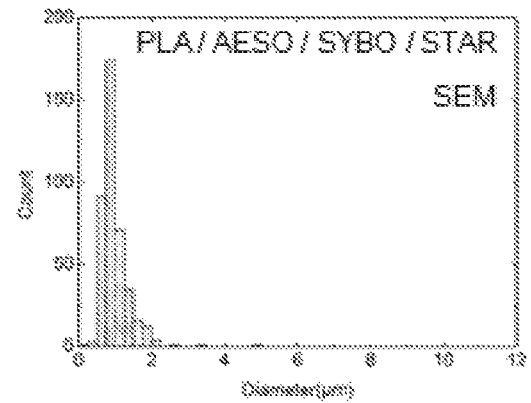

Optical micrographs of the blends and scanning electron micrographs of tensile bar fracture surfaces are shown in FIG. 3. All PLA/oil blends exhibited oil droplets dispersed throughout the PLA matrix, consistent with prior work on PLA/SYBO and PLA/castor oil blends. Image analysis was conducted on each micrograph in order to quantify the average droplet diameter ($D_m$) and interparticle distance (T) (shown in Table 2 below) from the oil droplet size distributions (shown in FIG. 4). Table 2 shows the average droplet diameter ($D_m$, μm) and interparticle distance (T, μm) of the PLA/oil blends. Procedures for calculation of $D_m$ and T are described above. $D_m$ (SEM) was determined through scanning electron microscopy. $D_m$ (OM) was determined through optical microscopy. The uses of NA indicate where the image had insufficient contrast (SEM) or insufficient resolution (OM) for calculation of $D_m$ and T.

TABLE 2

Average droplet diameter ($D_m$) and interparticle distance (T)

| Blend | $D_m$ (SEM, μm) | $D_m$ (OM, μm) | T (SEM, μm)[b] | T (OM, μm)[c] |
|---|---|---|---|---|
| PLA/SYBO | 6.4 ± 1.7 | 4.5 ± 1.3 | 3.4 | 3.6 |
| PLA/AESO | NA | 2.2 ± 0.4 | NA | 2.3 |
| PLA/AESO/SYBO | 2.1 ± 0.5 | 2.5 ± 0.5 | 2.0 | 2.5 |
| PLA/AESO/SYBO/STAR | 1.5 ± 0.4 | NA | 1.2 | NA |

The oil droplets are clearly visible in the PLA/SYBO and PLA/AESO/SYBO blend micrographs in FIG. 3, regardless of the imaging method. The enhanced contrast in the SEM micrographs is likely due to removal of the oil droplet through during the specimen fracture, leaving voids in the PLA matrix where oil droplets previously resided. In the case of the PLA/AESO blend, SEM did not provide a clear view of the AESO droplets, likely due to crosslinking of the AESO during the blend preparation process and lack of contrast between the PLA and crosslinked AESO phases. The PLA/SYBO blend exhibited a large $D_m$ with high degree of variability in the droplet size distribution. The PLA/AESO and PLA/AESO/SYBO blends exhibited a significantly narrower droplet size distribution and lower $D_m$. The interparticle distance was also found to be significantly lower in the PLA/AESO and PLA/AESO/SYBO blends as compared to the PLA/SYBO blend.

The reduction in $D_m$ observed in blends containing AESO may potentially be explained by the formation of compatibilizing molecules through a transesterification reaction between AESO (containing hydroxyl groups) and PLA, which may occur at the high temperatures required for drying and processing the blends. Similar behavior has been observed previously in blends of PLA and castor oil: blends containing 5 wt % castor oil exhibited a very narrow droplet size distribution with $D_m$=0.70±0.20 μm. Castor oil, like AESO, contains pendant hydroxyl groups (an average of 2.8 hydroxyl groups per molecule for both castor oil and the AESO used here).

Figure 5:
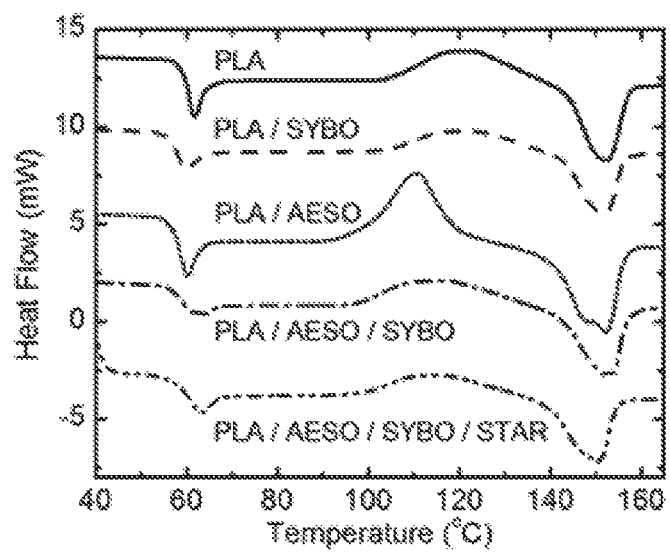
FIG. 5 shows differential scanning calorimetry data obtained from (a) first heating cycle and (b) second heating cycle for pressed PLA/oil tensile bars.
Figure 5:
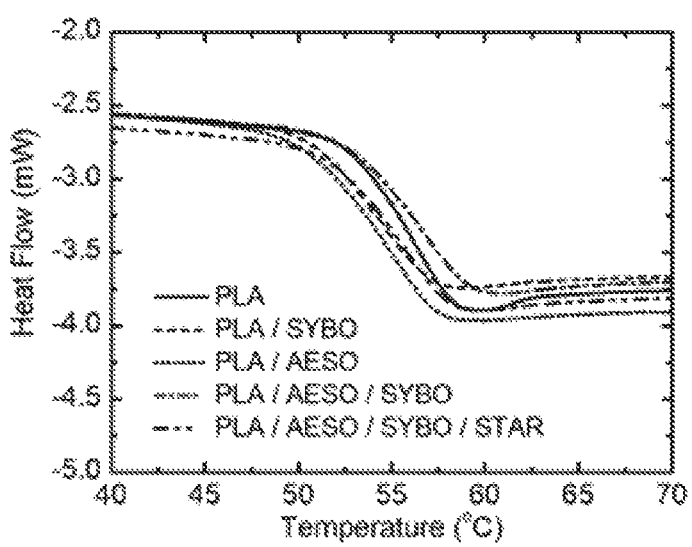

The thermal properties of the PLA/oil blends were investigated with DSC, as described above, and results are shown in Table 3 and FIG. 5. FIG. 5 shows DSC data obtained from the (a) first heating cycle and (b) second heating cycle of pressed PLA/oil tensile bars. Data in (a) have been shifted along the vertical axis for clarity. The legend in (b) applies to FIGS. 5(a) and 5(b). Table 3 below shows thermal properties of the compression molded PLA/oil tensile bars.

TABLE 3

Thermal properties

| Bar | $T_g$ (cycle 2, ° C.) | $T_m$ (cycle 1, ° C.) | $T_c$ (cycle 1, ° C.) | $\Delta H_m$ (J/g) | Crystallinity (%)[a] |
|---|---|---|---|---|---|
| PLA | 55.6 ± 0.4 | 148.1 ± 0.2 | 128.5 ± 0.4 | 2.6 ± 0.9 | 2.8 ± 1.0 |
| PLA/SYBO | 53 ± 2 | 152.0 ± 0.3 | 119 ± 4 | 1.6 ± 1.1 | 1.8 ± 1.2 |
| PLA/AESO | 54.6 ± 0.4 | 152.0 ± 0.2 | 109 ± 1 | 1.0 ± 0.2 | 1.1 ± 0.2 |
| PLA/AESO/SYBO | 53 ± 4 | 150 ± 2 | 113 ± 4 | 2.2 ± 0.5 | 2.7 ± 0.4 |
| PLA/AESO/SYBO\STAR | 55.6 ± 0.6 | 150.9 ± 0.5 | 114 ± 5 | 3.1 ± 0.9 | 1.5 ± 1.1 |

Minimal plasticization occurred in the blends with the addition of the oils as seen by the comparison of $T_g$ values for the blends in Table 3 (53-56° C.), which were comparable to the that of neat PLA (55° C.). The % crystallinity of all blends was in the range of 1-3%, and slightly lower than that of neat PLA. The presence of the oil domains did not appear to have had the effect of providing nucleation sites to increase the rate of crystallization of the PLA. The melting temperatures of the PLA/oil blends were higher than that of neat PLA and there was a significant reduction of the crystallization temperatures of the blends relative to neat PLA.

Figure 6:
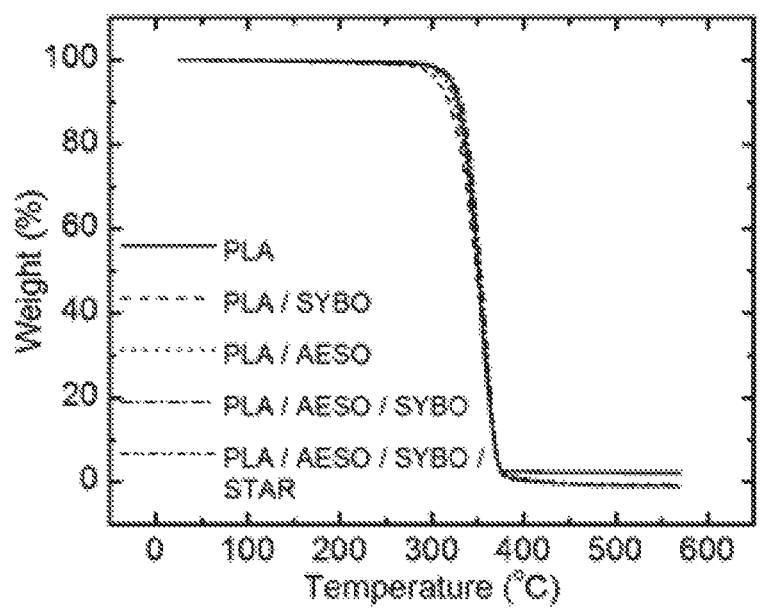
FIG. 6 shows thermogravimetric analysis data obtained from PLA/oil blends based on (a) weight % and (b) derivative weight as a function of temperature.
Figure 6:
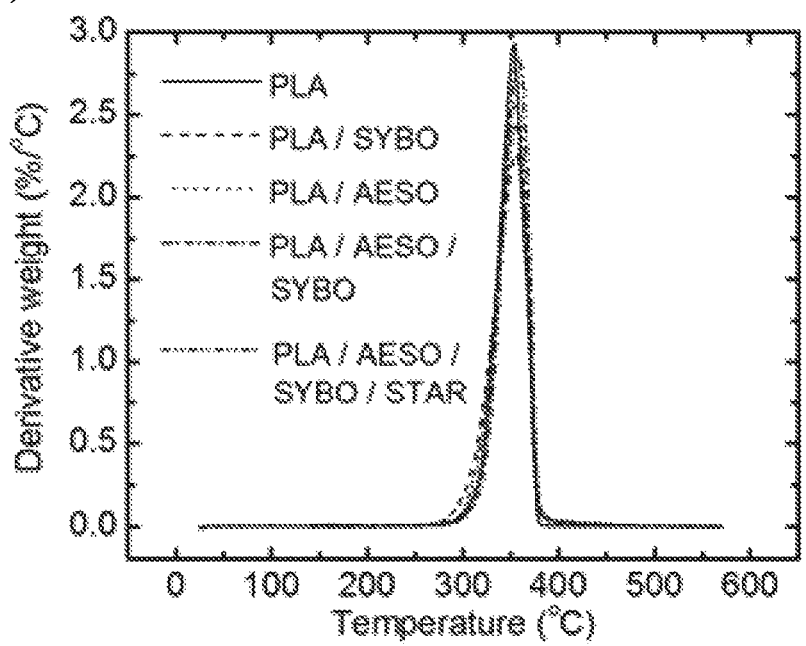

The thermal degradation behavior of PLA/oil blends was examined with TGA, with results shown in FIG. 6 and Table 4 below. FIG. 6 shows the thermogravimetric analysis data obtained from PLA/oil blends in terms of (a) weight % and (b) derivative weight as a function of temperature. Table 4 shows the thermal degradation temperatures of the PLA/oil blends.

TABLE 4

Thermal degradation temperatures

| Blend | Onset degradation temperature (° C.) | TGA derivative peak maximum (° C.) |
|---|---|---|
| PLA | 333.6 | 353.4 |
| PLA/SYBO | 326.4 | 355.5 |
| PLA/AESO | 327.9 | 355.4 |
| PLA/AESO/SYBO | 336.4 | 357.8 |
| PLA/AESO/SYBO/STAR | 329.8 | 355.0 |

The onset degradation temperature for all samples was around 330° C. and the peak in the derivative plot was observed around 355° C.

Figure 7:
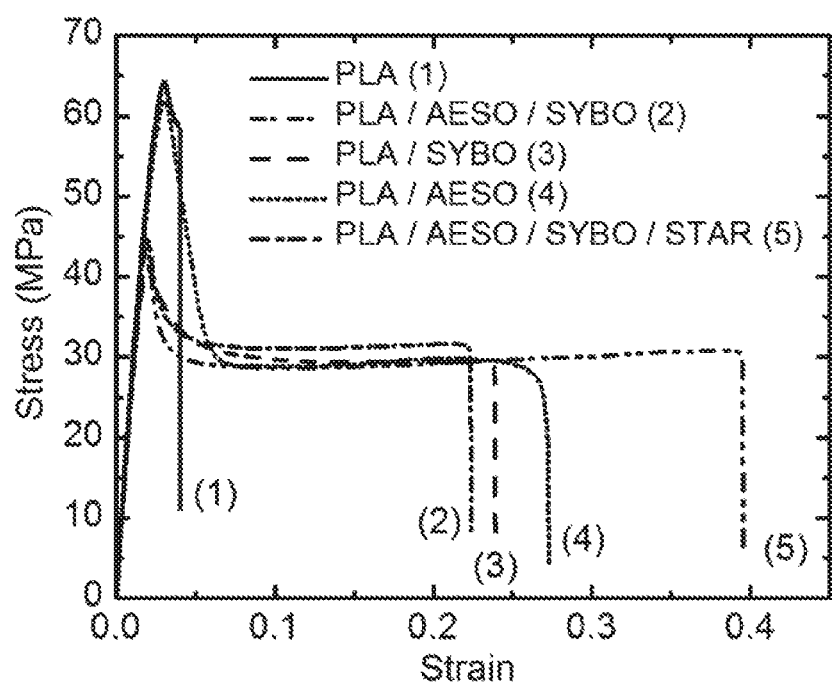
FIG. 7 shows tensile stress vs. strain obtained from PLA/oil blends of varying oil type.

The mechanical behaviors of neat PLA and the PLA/oil blends were characterized through tensile testing. Representative tensile data are provided in FIG. 7 and the average tensile properties for all samples are summarized in Table 5 below. FIG. 7 shows tensile stress vs. strain obtained from PLA/oil blends with varying oil type. Table 5 shows tensile properties of PLA/oil blends. In Table 5, the error was quantified through measurement of the standard deviation of results obtained. Bars with visible defects were excluded. Blends were vacuum dried at 190° C. for 12 h, followed by compression molding at 190° C.

Figure 8:
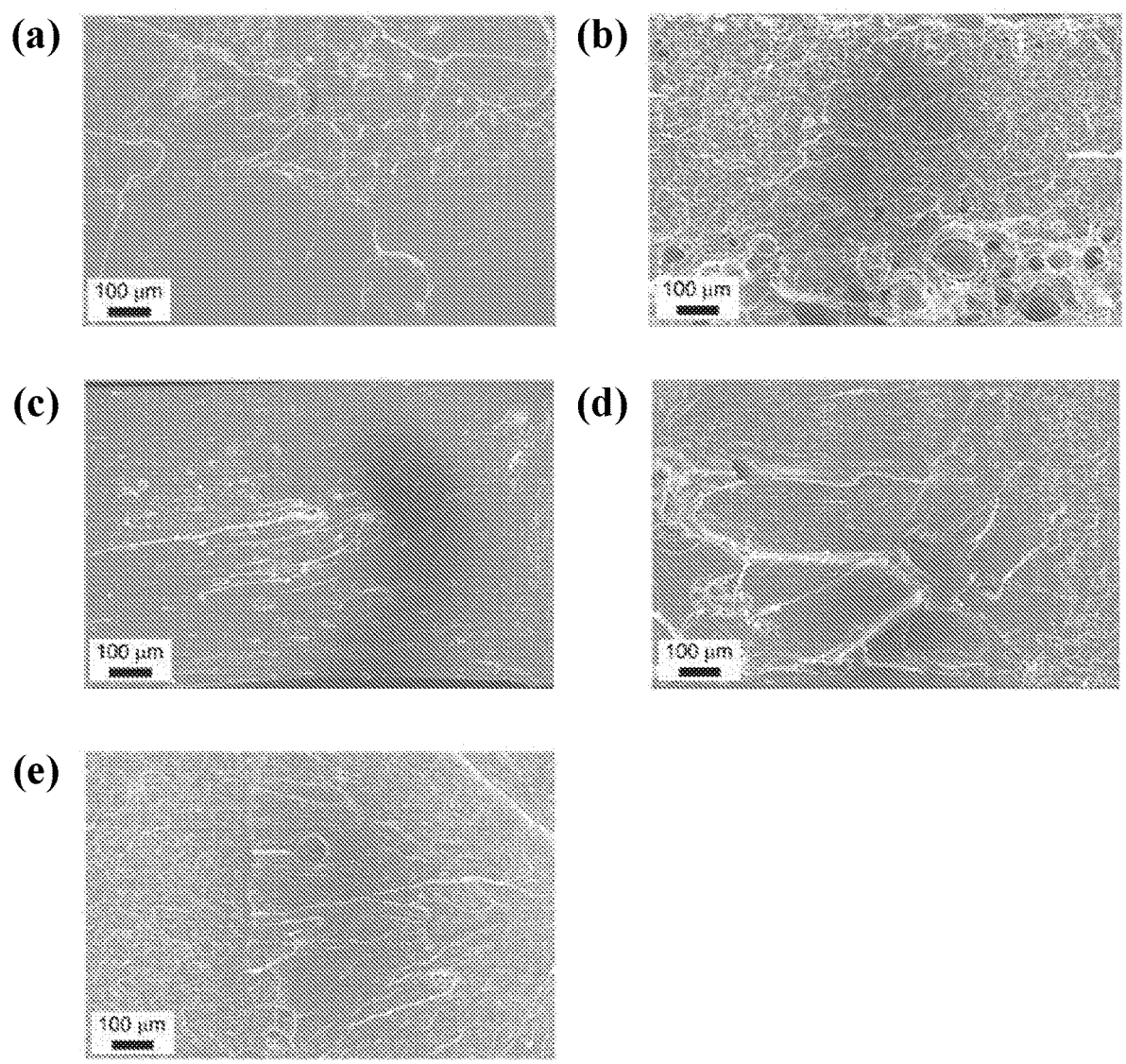
FIG. 8 shows scanning electron micrographs of tensile bar fracture surfaces of (a) PLA, (b) PLA/SYBO, (c) PLA/AESO, (d) PLA/AESO/SYBO, and (e) PLA/AESO/SYBO/STAR.

Neat PLA exhibited brittle failure at around 4% strain. The addition of oil significantly increased the elongation at break and tensile toughness of the blends relative to neat PLA, regardless of the choice of oil. The moduli of all blends (2.9 GPa) were fairly independent of the oil composition and only slightly lower than that of neat PLA (3.2 GPa). Addition of SYBO, or a mixture of SYBO/AESO, resulted in a noticeable reduction in the tensile strength relative to PLA. The PLA/AESO blend had the greatest tensile strength of all the blends, which was comparable to that of neat PLA. All blends exhibited a lower stress at break as compared to neat PLA. SEM micrographs of the tensile bar fracture surfaces are shown in FIG. 8. The neat PLA fracture surface is characteristic of brittle fracture. The PLA/oil blends exhibited a higher degree of deformation of the matrix, likely shear yielding, which can be induced by cavitation of the dispersed phase and has been observed previously in rubber toughened PLA blends.

Though the PLA/AESO blend exhibited promising characteristics of high tensile strength (similar to that of neat PLA) and enhanced elongation at break and toughness relative to neat PLA, the tensile results for this blend showed wide variability, particularly in the values of the elongation at break and stress at break. Voids were observed on the surface of many tensile testing specimens prepared for the PLA/AESO mixture (the results summarized in Table 5 do not include specimens containing visible voids). In order the explore the origins of the variability of the tensile testing results obtained from the PLA-AESO blend further, morphological and thermal analysis of PLA/AESO tensile bars which exhibited high and low elongation (72.5 vs. 3.18% elongation at break) were conducted. The two bars did not exhibit any noticeable differences when examined with an optical microscope. Though the bars fractured at significantly different strain values, the thermal properties were quite similar, shown in Table 6 below. Table 6 shows the properties of compression molded PLA and PLA/AESO tensile bars. All samples were compression molded at 190° C. $\Delta H_m^\infty$ of 94 J/g was used as the enthalpy of melting for an infinite PLLA crystal.

TABLE 5

Tensile properties

| Blend | Tensile Strength (MPa) | Elongation at Break (%) | Toughness (MPa) | Stress at Break (MPa) | Modulus (GPa) |
|---|---|---|---|---|---|
| PLA | 64 ± 2 | 4.1 ± 0.9 | 1.9 ± 0.5 | 58 ± 2 | 3.1 ± 0.1 |
| PLA/SYBO | 44 ± 3 | 24 ± 14 | 8 ± 4 | 25 ± 6 | 2.9 ± 0.1 |
| PLA/AESO | 62 ± 1 | 31 ± 39 | 10 ± 12 | 33 ± 11 | 2.9 ± 0.1 |
| PLA/AESO/SYBO | 44 ± 4 | 20 ± 9 | 6 ± 3 | 29 ± 3 | 2.9 ± 0.1 |
| PLA/AESO/SYBO/STAR | 44 ± 1 | 39 ± 6 | 11 ± 2 | 30 ± 1 | 2.90 ± 0.02 |

TABLE 6

Properties of Compression Molded Tensile Bars

| Bar Type | Drying Temp. (° C.)[a] | Tensile Strength (MPa) | Elongation at Break (%) | $T_g$ (cycle 2, ° C.) | $T_m$ (cycle 1, ° C.) | $\Delta H_m$ (J/g) | Crystallinity (%)[b] |
|---|---|---|---|---|---|---|---|
| PLA/AESO | 160 | 60 | 4.4 | 55.5 | 152.6 | 0.7 | 0.8 |
| PLA/AESO "High elongation bar" | 190 | 62 | 73 | 55.6 | 151.8 | 0.7 | 0.8 |
| PLA-AESO "Low elongation bar" | 190 | 59 | 3.2 | 55.0 | 152.0 | 1.2 | 1.4 |

Therefore, the wide variability in the tensile data is not explained by the presence of morphological or thermal property differences between test specimens. This variability in the PLA/AESO tensile behavior is addressed in the example below, which discusses processing effects on the blend properties.

Example 6. Effects of Processing Conditions on Blends

Figure 9:
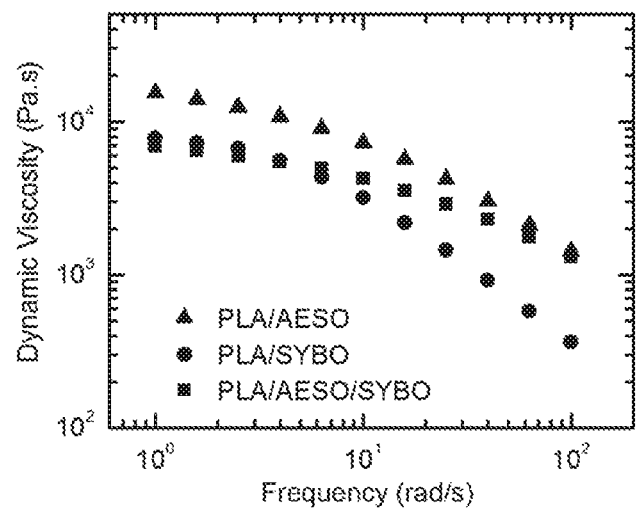
FIG. 9 shows dynamic viscosity of PLA/oil blends at (a) 160° C. and (b) 190° C.
Figure 9:
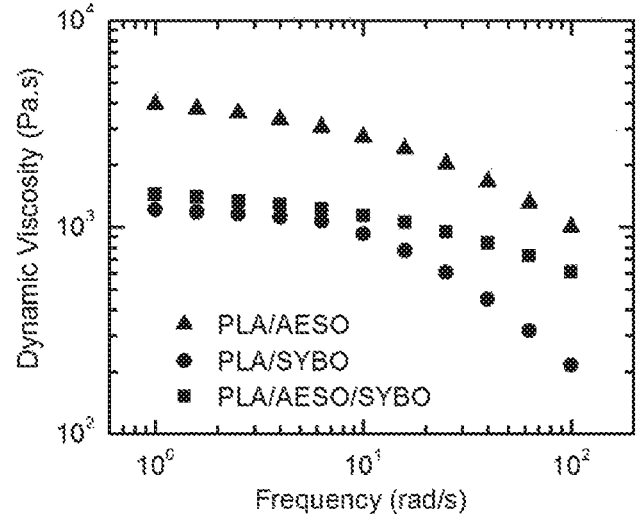

The PLA/AESO blend exhibited wide variability in the measured tensile properties. The origin of this behavior was investigated in more detail through variation of processing conditions. Without wanting to be bound by theory, the hypothesis was that the crosslinking of the AESO phase during the blending process resulted in a higher viscosity of the PLA/oil mixture, which inhibited the ability to produce defect-free tensile specimens through compression molding. In order to investigate this hypothesis further, the dynamic viscosity of the blend was measured through rheology, with results shown in FIG. 9. FIG. 9 shows the dynamic viscosity of PLA/oil blends at (a) 160° C. and (b) 190° C. The blends were solvent cast and dried at 190° C., followed by compression molding at 190° C. The dynamic viscosity was measured at the specified temperatures.

The PLA/AESO blend viscosity was higher than that of the PLA/SYBO blend, regardless of the frequency used in the measurement. This trend was observed regardless of the measurement temperature (190° C. and 160° C.). Interestingly, the blend containing the 50/50 AESO/SYBO mixture showed behavior similar to that the PLA-AESO blend at high frequencies and similar behavior to that of the PLA-SYBO blend at low frequencies. With the hypothesis that lowering the drying temperature would limit the extent of crosslinking of the AESO droplets, thus improving the processability of this blend, we also prepared tensile testing specimens through drying at 160° C. Lowering the drying temperature did not improve the repeatability of the tensile testing measurement of the PLA/AESO blend. An example of a bar with low elongation at break is shown in Table 4 above.

Example 7. PLA Star Polymer Compatibilizer

Figure 10:
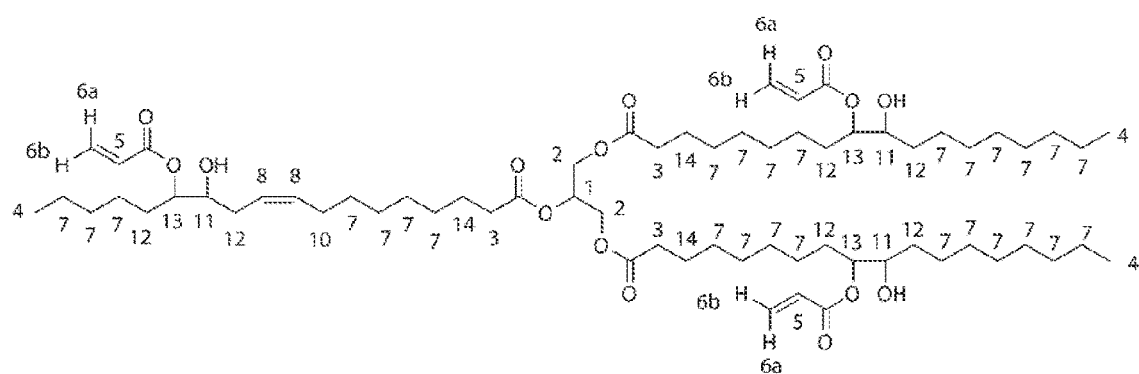
FIG. 10 shows (a) chemical structure of AESO and (b) Proton nuclear magnetic resonance ($^1$H NMR) data obtained from AESO.
Figure 10:
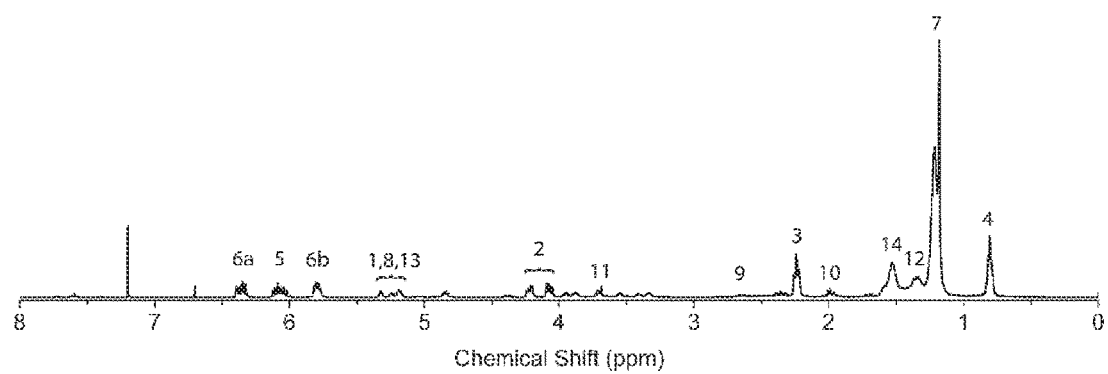

A PLA star polymer (STAR) was synthesized through the ring-opening polymerization of L-lactide, initiated from the hydroxyl groups of AESO (Scheme 1, FIG. 1). Through $^1$H NMR analysis (FIG. 10), it was determined that the AESO employed in these examples contained an average of 2.8 acrylate groups per molecule (and therefore 2.8 hydroxyl groups per molecule, on average; refer to Scheme 1). FIG. 10(b) shows the $^1$H NMR data obtained from AESO. The chemical structure of AESO is included in FIG. 10(a). The number of acrylate groups per molecule was calculated to be 2.8 using the relative peak areas of 5/6a/6b and 2. 9 is not shown in the representative chemical structure, but is associated with a proton present on linoleic or linolenic acid: CH=CH—CH$_2$—CH=CH. The presence of epoxide groups was not detected in the AESO sample (characteristic peaks located in the vicinity of 3 ppm were not observed). However, the molecules present in the AESO sample in theory may contain anywhere from 0-9 acrylate groups (and therefore hydroxyl groups), as the number of double bonds per fatty acid ranges from 0-9 in soybean oil (i.e. compare the various types of fatty acids which are found in soybean oil, such as stearic and palmitic acid, which are fully saturated, to linolenic acid, which contains 3 double bonds). Based on this characterization of the AESO sample, it was calculated that the PLA star polymer contains an average of 2.8 arms per molecule (with molecules present that contain a range of 0-9 arms per molecule).

Figure 11:
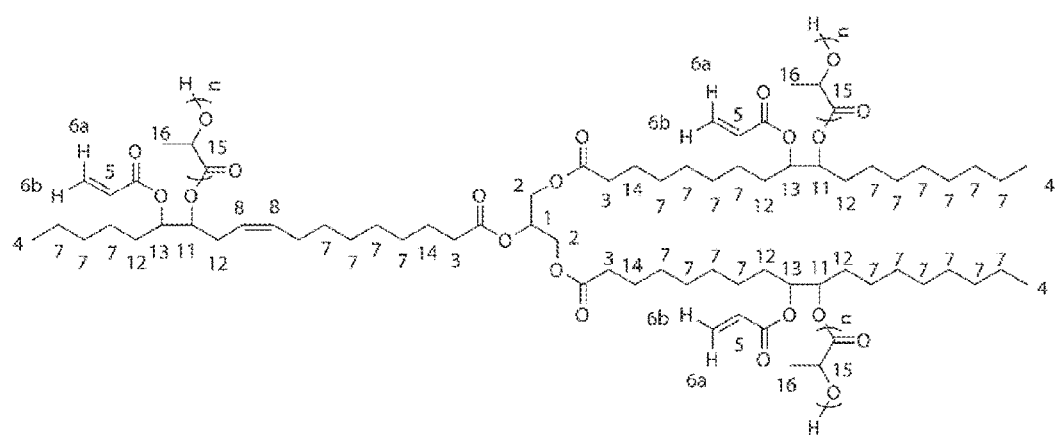
FIG. 11 shows (a) chemical structure of an example of a star polymer and (b)$^1$H NMR data obtained from the star polymer.
Figure 11:
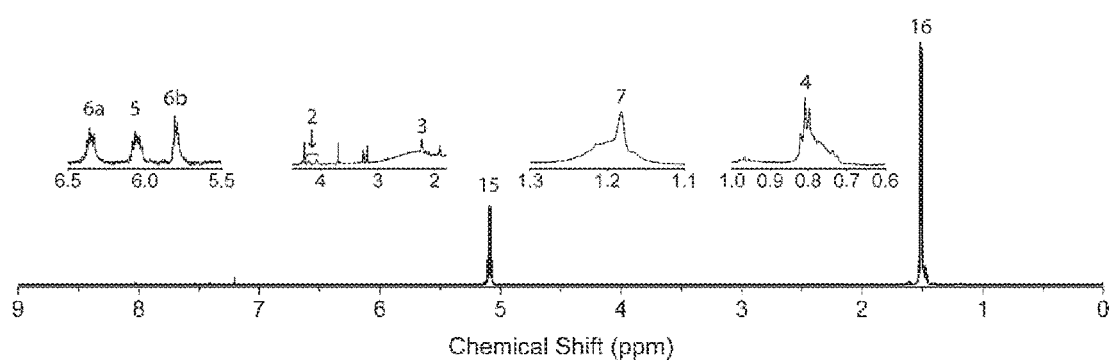
Figure 12:
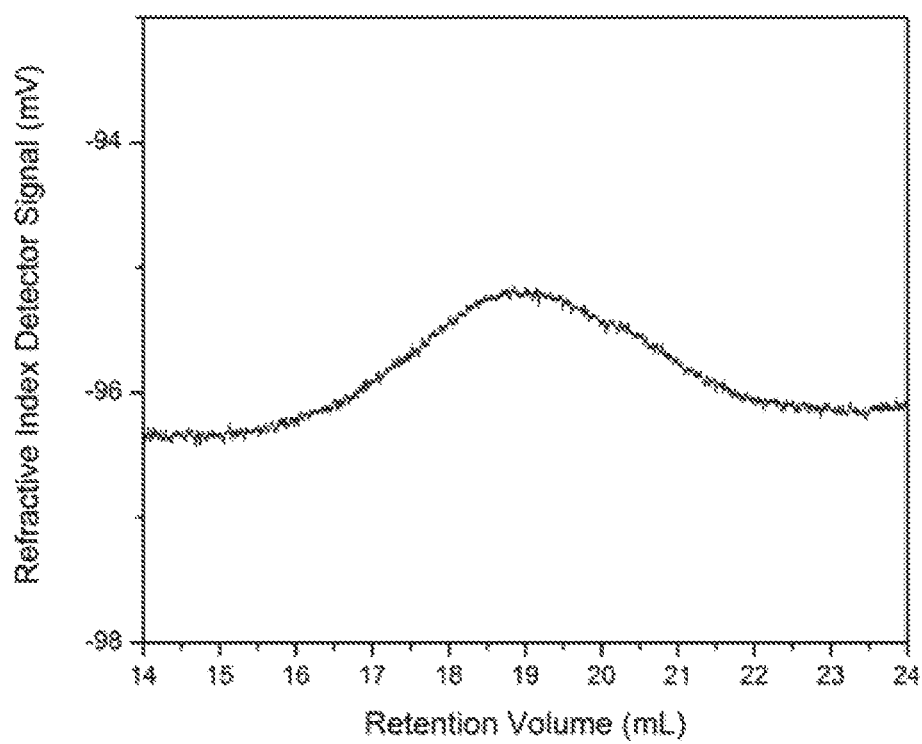
FIG. 12 shows GPC refractometer signal obtained from an example of a PLA star polymer.

$^1$H NMR end-group analysis (shown in FIG. 11(b)) was employed to confirm the presence of characteristic peaks associated with PLA and the AESO core in the PLA star polymer. The chemical structure of the star polymer is included in FIG. 11(a). GPC refractometer signal data obtained from the PLA star polymer are shown in FIG. 12. The characteristics of the PLA star polymer molecular weight distribution were determined to be: $M_n$=45.6 kg/mol and Đ=3.55 (using GPC with light scattering). The high dispersity can be explained by the wide variation in the AESO chemical structure and resulting variation in the numbers of arms per molecule in the PLA star polymer, as is discussed above.

The PLA star polymer was employed as a compatibilizer for PLA/oil blends. Based on the results of the mechanical testing of PLA/oil blends, the PLA/AESO/SYBO blend was chosen for investigating the effect of addition of compatibilizer. All PLA/oil blends exhibited a significant improvement in the elongation at break and tensile toughness relative to neat PLA (see Table 5 above). The PLA/AESO/SYBO blend was chosen for compatibilization studies as the average droplet size $D_m$ was significantly less than that of the PLA/SYBO blend (see Table 2 above), and it also exhibited greater reproducibility and lower error in the measured tensile parameters as compared to the PLA/AESO blend (Table 5).

The addition of the PLA star polymer compatibilizer had a dramatic effect on the average droplet size and interparticle distance of the PLA/AESO/SYBO blend, which were reduced to 1.5 and 1.2 μm, respectively (Table 2, FIG. 3). The $T_g$ and percent crystallinity of the compatibilized blend were indistinguishable from that of neat PLA, and higher than that observed in all uncompatibilized PLA/oil blends (Table 3). The compatibilized PLA/AESO/SYBO blend also exhibited the highest elongation at break and tensile toughness values of all the PLA/oil blends, which was a considerable improvement over the properties of neat PLA: the elongation at break and tensile toughness of the PLA/AESO/SYBO/STAR blend were 10 and 6 times greater than that of neat PLA, respectively (Table 5, FIG. 7).

What is claimed is:

1. A biorenewable additive composition for use in improving the performance of biorenewable thermoplastics, comprising:
an additive selected from the group consisting of a modified natural oil, a blend of a modified natural oil and an unmodified natural oil, and a blend of a modified natural oil, an unmodified natural oil and a compatibilizer, wherein the modified natural oil is acrylated epoxidized soybean oil (AESO), the unmodified natural oil is soybean oil (SYBO), and the compatibilizer is a star polymer compatibilizer.

2. The composition of claim 1, wherein the additive is a 50/50 blend of acrylated epoxidized soybean oil (AESO) and soybean oil.

3. The composition of claim 1, wherein the additive is a 25/25/50 blend of acrylated epoxidized soybean oil (AESO), soybean oil (SYBO), and a star polymer compatibilizer.

4. The composition of claim 1, wherein the star polymer compatibilizer has the structure:

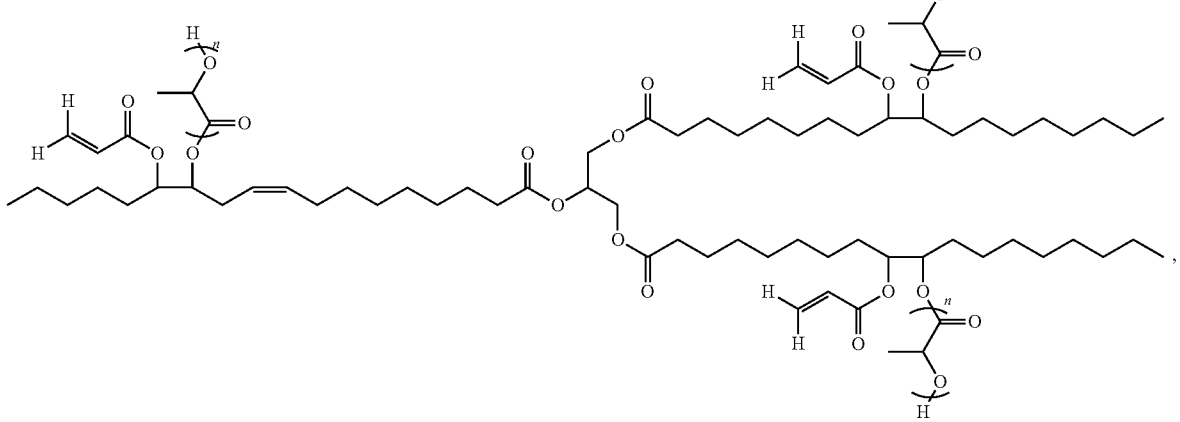

wherein n is between about 10 and about 10,000.

5. A modified biorenewable thermoplastic having improved performance, comprising:
a biorenewable thermoplastic; and
the composition of claim 1,
wherein the composition is dispersed within the thermoplastic.

6. The modified biorenewable thermoplastic of claim 5, wherein the biorenewable thermoplastic is polylactide (PLA).

* * * * *

UNITED STATES PATENT AND TRADEMARK OFFICE
CERTIFICATE OF CORRECTION

PATENT NO. : 10,793,713 B2
APPLICATION NO. : 15/776196
DATED : October 6, 2020
INVENTOR(S) : Megan Robertson et al.

It is certified that error appears in the above-identified patent and that said Letters Patent is hereby corrected as shown below:

In the Specification

Column 7, Line 40, delete "(D)=2.43" and insert -- (Đ)=2.43 --, therefor.
Column 9, Line 49, delete "(α=1" and insert -- (σ=1 --, therefor.
Column 16, Line 37, delete "D–3.55" and insert -- Đ=3.55 --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*